United States Patent [19]

Weeks

[11] Patent Number: 4,865,290

[45] Date of Patent: Sep. 12, 1989

[54] SOLENOID MOUNTING BRACKET

[76] Inventor: David E. Weeks, 430 Spencer Rd., Candor, N.Y. 13743

[21] Appl. No.: 271,981

[22] Filed: Nov. 16, 1988

[51] Int. Cl.⁴ .............................................. F16M 3/00
[52] U.S. Cl. ................................. 248/674; 248/220.2
[58] Field of Search .............. 248/674, 675, 672, 678, 248/220.2, 222.2, 225.31, 231.8, 309.1, 313, 224.3, 223.3; 310/91

[56] References Cited

U.S. PATENT DOCUMENTS

| | | | |
|---|---|---|---|
| 4,097,012 | 6/1978 | McIntyre | 248/674 |
| 4,313,043 | 1/1982 | White. | |
| 4,314,220 | 2/1982 | Ito et al. | 248/222.2 X |
| 4,512,543 | 4/1985 | Petrick. | |
| 4,531,700 | 7/1985 | Robinson | 248/674 X |
| 4,598,894 | 7/1986 | Johannes | 248/615 |

Primary Examiner—Ramon O. Ramirez

[57] ABSTRACT

A mounting arrangement for a solenoid includes a frame member and a plurality of mounting elements formed integral with the frame member. A wall member has first, second and third projections which extend therefrom and are spaced to receive first and second frame portions of the solenoid. A pair of lugs are formed integral with the frame member and include slanted surfaces to enable rotation of the solenoid into mounting position.

10 Claims, 2 Drawing Sheets

SOLENOID MOUNTING BRACKET

BACKGROUND OF THE INVENTION

In the field of printing, the most common type printer has been the printer which impacts against record media that is caused to be moved past a printing line or line of printing. As is well-known, the impact printing operation depends upon the movement of impact members, such as print hammers or wires or the like, which are typically moved by means of an electromechanical drive system and which system enables precise control of the impact members.

In the field of dot matrix printers, it has been quite common to provide a print head which has included therein a plurality of print wire actuators or solenoids arranged or grouped in a manner to drive the respective print wires a very short, precise distance from a rest or non-printing position to an impact or printing position. The print wires are generally either secured to or engaged by the solenoid plunger or armature which is caused to be moved such precise distance when the solenoid coil is energized and wherein the plunger or armature normally operates against the action of a return spring.

It has also been quite common to provide an arrangement or grouping of such, solenoids in a circular configuration to take advantage of reduced space available in the manner of locating the print wires in that specific area between the solenoids and the front tip of the print head adjacent the record media. In this respect, the actuating ends of the print wires are positioned in accordance with the circular arrangement and the operating or working ends of the print wires are closely spaced in vertically-aligned manner adjacent the record media. The availability of narrow or compact actuators permits a narrower or smaller print head to be used and thereby reduces the width of the printer because of the reduced clearance at the ends of the print line. The print head can also be made shorter because the narrow actuators can be placed in side-by-side manner closer to the record media for a given amount of wire curvature.

In the wire matrix printer which is utilized for receipt and for journal printing operations, the print head structure may be a multiple element type and horizontally disposed with the wire elements aligned in a vertical line and supported on a print head carriage which is caused to be moved or driven in a horizontal direction for printing in line manner across the receipt or journal paper and wherein the drive elements or transducers may be positioned in a circular configuration with the respective wires leading to the front tip of the print head. In the wire matrix printer which is utilized for business forms or like record media printing operation, the print head may be oriented in a manner wherein the nose is pointed downward for printing on the form, slip or like media while the carriage and print head are moved above and across the form or media in the horizontal direction.

In the dot matrix printer, there is a requirement for one or more small electric motors to drive certain parts of the printer. A small motor is used to drive the print head carriage in reciprocating manner in the printer that includes a stationary platen and a movable print head. A second motor is used to drive the paper such as a receipt, a slip or a journal at the end of the printing operation and which paper drive is usually performed at the ends of the lines of printing.

The demands of certain printing operations place a high duty cycle on the drive motor and associated drive mechanisms and it is essential that the motor and mechanisms be secured and contained in an appropriate manner because the motor and mechanisms are relied upon for long lasting operation which may involve either continuous or intermittent duty.

The use of screws, bolts, nuts and the like is well-known for securing the motor mounting flange to a side frame of the printer. Other fastening members have included self-tapping screws, for example, in plastic frames or serrated washers engaging the surface of metal frames. It is, of course, realized that the use of a smaller number of parts enables simpler and less costly products while maintaining quality of such products.

It is also true of other parts of the printer that such parts are subject to high duty cycles and to vibrations which affect the operation and life of the printer. Additionally, it is important in the manufacturing process that the use of a smaller number of parts enables simpler, less costly and easier assembly of the product.

Representative documentation in the field of mechanism mountings includes U.S. Pat. No. 4,313,043, issued to J. A. White on Jan. 26, 1982, which discloses a module support assembly having a primary support member comprising a U-shaped bracket having a back wall and side walls and defining a front facing opening for insertion of the module.

U.S. Pat. No. 4,512,543, issued to D. C. Petrick on Apr. 23, 1985, discloses a universal printer stand having a platform with spaced support members, spaced cross members and receiving means on the cross members along with means for adjusting the receiving means.

U.S. Pat. No. 4,598,894, issued to H. Johannes on July 8, 1986, discloses means to secure a body including a pair of rigid plates shaped to conform to the body and fixed on opposite plane faces of the body with corner sections along with a fastening element having a main strip of depth equal to the depth of the body plus the thickness of the rigid plates, and a retaining brace within the included angle of the strip along with locking means on the surface of the strip.

SUMMARY OF THE INVENTION

The present invention is directed to solenoid mounting means and more particularly to a mounting bracket for supporting the solenoid in a printer. The mounting bracket is of unitary construction and provides supporting portions that are formed to receive the frame member of the solenoid and to secure the solenoid in place.

The supporting portions of the bracket are integral with and formed as a part of a frame member of the printer. A preferred material for the mounting means is 7% glass filled polycarbonate, base material G.E. 5247. While such positioning and securing means is preferably made of plastic in a molding operation, it is, of course, optional to make the part or parts of sheet metal by means of a stamping operation, dependent upon the requirements for insulation and grounding.

The plastic mounting bracket includes a wall projecting downwardly and integral with the frame member of the printer and a gusset provides support for the wall against any movement in either direction. The wall includes a first projection extending perpendicular from one side of the wall and spaced at a precise distance from the frame member. A second projection of similar size as the first projection extends perpendicular from the one side of the wall and is spaced at a greater distance from the first projection than the first projection is spaced from the frame member. A third projection of the wall is located at the bottom thereof and extends perpendicular from the one side of the wall farther than the first and the second projections. The third projection is spaced from the second projection substantially the same distance as the first projection from the frame member.

A pair of opposed walls are spaced from each other and from the upstanding wall and are formed integral with the frame member of the printer. The opposed walls have slanted end portions for conveniently receiving the solenoid.

A pair of retainers in the form of snap members are spaced from the upstanding wall and are located near one end of the two opposed walls. The snap members have slanted portions and straight portions facing the upstanding wall.

A solenoid that is useful in the printer is a box-type solenoid that has top and bottom frame portions and end portions. The sides of the solenoid are open. The solenoid is assembled and mounted in the bracket by placing an edge of the bottom frame portion in the slot formed by and between the second projection and the third projection and then placing an edge of the top frame portion in the slot formed by and between the first projection and the frame member of the printer. The opposite edge of the top frame portion of the solenoid is slid over the snap members and as the opposite edge engages the slanting surfaces of the snap members the solenoid is rotated slightly to secure the edges of the top and bottom frame members of the solenoid into the slots formed by the respective projections. A straight edge adjacent the slanting edge of each of the snap members engages with the edge of the bottom frame portion to secure the solenoid in place.

In accordance with the present invention, there is provided an arrangement for mounting a solenoid having first and second frame portions that have edge portions that fit between and are secured by projections formed integral with a wall member and with a frame member.

In view of the above discussion, a principal object of the present invention is to provide positioning and securing means for an electrical solenoid or other electromechanical or mechanical component.

Another object of the present invention is to provide a mounting bracket for a solenoid having a mounting flange in the form of top and bottom frame portions.

An additional object of the present invention is to provide a mounting bracket for an electrical solenoid wherein the bracket includes a plurality of projections or fingers as an integral part of the bracket for clamping mounting flanges of the solenoid.

A further object of the present invention is to provide a frame portion of a printer that forms a part of a mounting bracket for a small solenoid wherein the bracket has projecting members which clamp the solenoid mounting flanges and has snap members for positioning and retaining the flanges.

Additional advantages and features of the present invention will become apparent and fully understood from a reading of the following description taken together with the annexed drawing.

DESCRIPTION OF THE PREFERRED EMBODIMENT

Prior to describing the structure in detail, it should be noted that the printer of the present invention is a multi-function type that can accommodate a receipt, a journal and a slip or form which form consists of one or more parts. The printer can be set in one of five different modes of operation which include printing a journal only, printing a receipt only, printing a receipt and a journal, printing a slip or form only, or printing a slip or form and a journal. The journal and the receipt can accommodate 42 columns of printing and the slip or form can accommodate 46 columns of printing.

Figure 1:
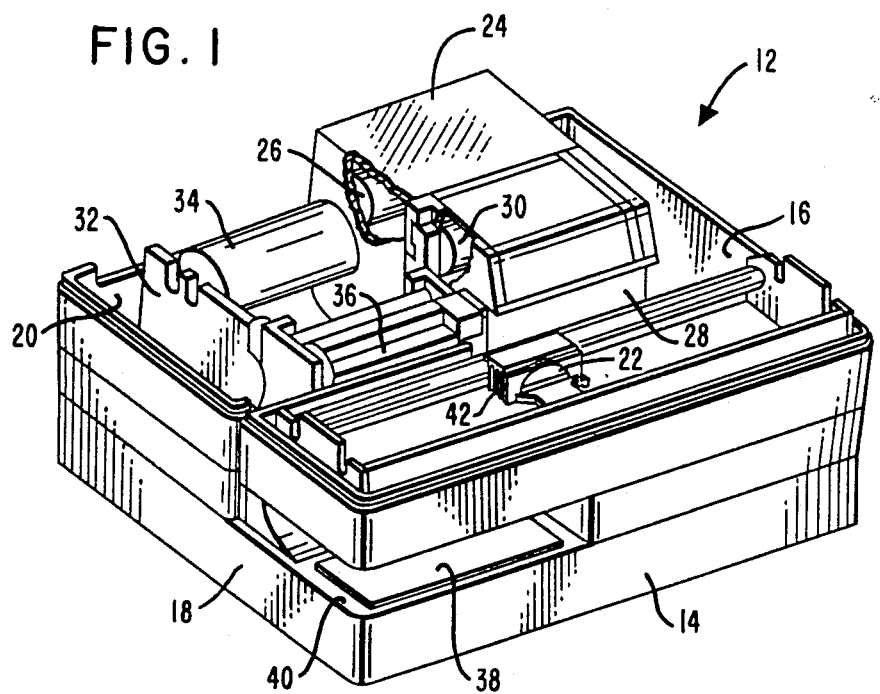
FIG. 1 is a perspective view of a printer of the type utilizing the subject matter of the present invention.

Referring now to the drawing, FIG. 1 shows a perspective view of a printer 12 incorporating the structure of the present invention and having a front portion 14, a right side 16, a left side 18, and a rear portion 20. A wire matrix print head 22 is moved in a side-to-side manner by suitable motor drive means (FIG. 3) located at the right front corner of the printer. A journal station or module 24 is provided at the right hand side of the printer and includes a supply roll 26 of journal paper that is guided past the journal print station platen 28 and is rewound on a take-up roller 30 by a step-type drive motor (not shown).

A receipt station or module 32 is provided at the left hand side of the printer and includes a supply roll 34 of receipt paper that is guided past the receipt print station platen 36 and is driven by a step-type drive motor (not shown). The journal station and the receipt station are separated by six character spaces. A ribbon cassette (not shown) of the operator-changeable type is positioned to the rear of the print head 22 (toward the viewer of the illustration in FIG. 1) and the ribbon is driven in one direction from right to left in a path between the front portion of the print head 22 and the record media (journal, receipt or slip). A slot 40 is provided at the left front side of the printer for insertion of a slip 38 which can be inserted from the front of the printer or from the side thereof in a path in front of the receipt paper at the receipt station. A heat sink 42 is provided for the print head 22 to dissipate heat therefrom. A more detailed description of the arrangement of the receipt station and slip station is found in U.S. Pat. No. 4,780,007, issued Oct. 25, 1988 and assigned to the assignee of the present invention.

Figure 2:
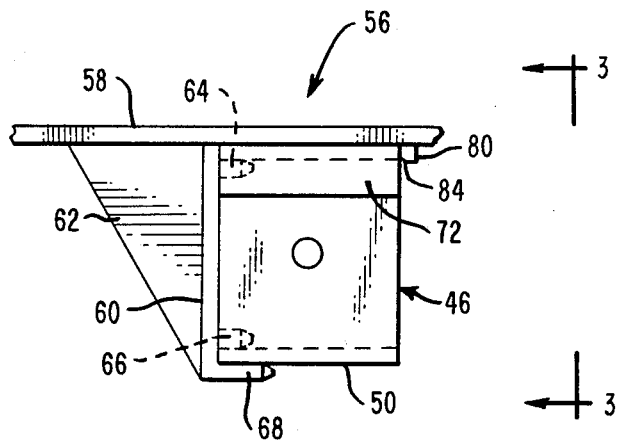
FIG. 2 is an elevational view of a printer frame member incorporating the mounting structure of the present invention.
Figure 3:
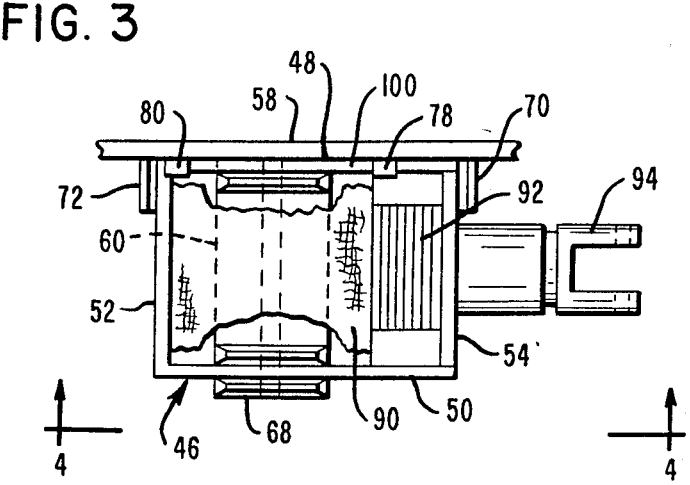
FIG. 3 is a view taken on the line 3—3 of FIG. 2.
Figure 4:
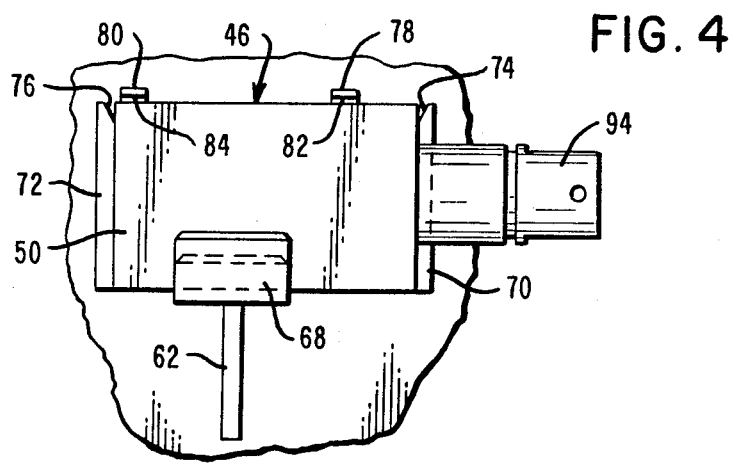
FIG. 4 is a view taken on the line 4—4 of FIG. 3.

FIGS. 2, 3 and 4 illustrate the structure for mounting a latching solenoid 46 of box-like construction. The latching solenoid 46 is used in the operation of the forms compensating mechanism which provides for accommodating different thicknesses of paper in the printer 12. The solenoid 46 includes a pull coil and a return coil operating with two permanent magnets, the arrangement thereof being well-known in the art. The solenoid 46 includes a U-shaped frame member comprising a top or first portion 48, an end portion 52 and a bottom or second portion 50, the orientation of portions 48 and 50 being noted for convenient description thereof. A closure portion 54 joins portions 48 and 50 opposite the end portion 52. The front and back sides of the solenoid 46 between the top and bottom portions 48 and 50 are open.

A mounting bracket 56 for holding and securing the solenoid 46 is of unitary construction and provides supporting portions that are formed to receive the U-shaped frame of the solenoid. A planar frame member 58 of the printer 12 is located forwardly of the receipt station 36 and includes a plurality of formed portions integral therewith. A preferred material for the frame member 58 and the supporting portions is 7% glass filled polycarbonate, base material G.E. 5247 which material is flame retardant and ultraviolet stable and is suitable for supporting the solenoid 46 in repeated operations.

The mounting bracket 56 includes a wall 60 formed or molded integral with the frame member and projecting substantially perpendicular in a direction downwardly from the planar frame member 58. A gusset member 62 is formed or molded integral with the frame member 58 and with the wall 60 to provide support for the wall against any movement in either direction when the solenoid 46 is installed or removed from the mounting bracket 56.

The mounting bracket 56 includes a first projection 64 extending perpendicular from one side of and formed or molded integral with the wall 60 on the side opposite the gusset member 62 and spaced at a precise distance from the frame member 58. A second projection 66 of similar size as the first projection 64 extends perpendicular from the same side of and is formed or molded integral with the wall 60 and is spaced at a greater distance from the first projection 64 than the first projection is spaced from the frame member 58. A third projection 68 of the wall 60 is located at the bottom of the wall and extends perpendicular from the same side of and is formed or molded integral with the wall. The third projection 68 extends farther from the wall 60 than the first projection 64 and the second projection 66. The third projection 68 is spaced from the second projection 66 substantially the same distance as the distance from the frame member 58 to the first projection 64.

A pair of opposed walls 70 and 72 are formed or molded integral with the frame member 58 and are spaced from each other in parallel relationship. The walls 70 and 72 are oriented in the same direction as the gusset 62 and are spaced from each other at a distance substantially equal to the length of the top portion 48 and the length of the bottom portion 50 of the solenoid 46. The walls 70 and 72 have slanted or sloping end portions 74 and 76 for conveniently receiving the end portion 52 and the closure portion 54 of the solenoid 46.

A pair of retainers in the form of small lugs 78 and 80 are also formed or molded integral with the frame member 58. The lugs 78 and 80 are spaced from the wall 60 and are located along a line located near the slanted end portions 74 and 76. The lugs 78 and 80 have slanted portions 82 and 84 and straight portions 86 and 88 facing the wall 60. The slanted portions 82 and 84 provide an arrangement wherein the solenoid 46 is snapped into place when securing the solenoid into position by use of the projections 64, 66 and 68. The slanted portions, while engaging with an edge of the top frame portion 48, enable the solenoid 46 to be rotated a small amount and to place the solenoid into position, and the straight portions 86 and 88 of the lugs 78 and 80 bear against one edge of the top portion 48.

Figure 5:
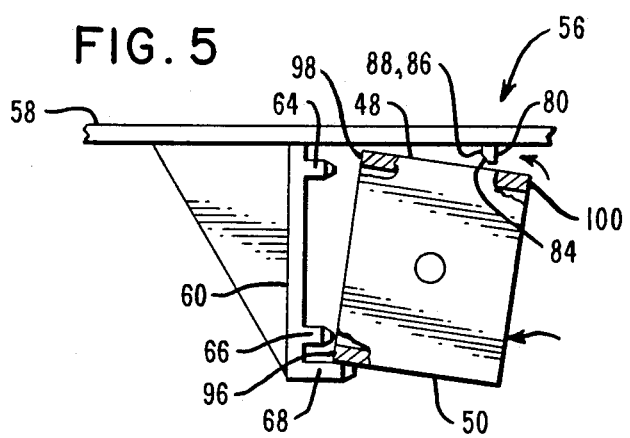
FIG. 5 is a view similar to FIG. 2 and showing the orientation of the solenoid in mounting thereof.

FIG. 5 is a view similar to FIG. 2 and illustrates the manner in which the solenoid 46 is installed or inserted into the mounting bracket 56. The opposed walls 70 and 72 are not shown in FIG. 5 for reason of clarity. Also straight portion 86 of lug 78 is shown aligned with straight portion 88 of lug 80. The solenoid 46 is a box-type unit that includes the top plate portion 48 and the bottom plate portion 50 that fit into the space between the frame member 58 and the first projection 64 and the space between the second projection 66 and the third projection 68. As mentioned above, the sides of the solenoid 46 are open and expose a coil 90 and a permanent magnet 92. A plunger 94 is provided in the solenoid 46 and extends to the right (FIGS. 3 and 4) for coupling with an arm (not shown) of the forms compensation mechanism at the receipt/slip station 36 of the printer 12.

The solenoid 46 is assembled and mounted in the mounting bracket 56 by placing an edge 96 of the bottom portion 50 into the slot or space formed by and between the third projection 68 and the second projection 66, as illustrated in FIG. 5. The top portion 48 of the solenoid 46 is slid under and past the lugs 78 and 80 in position to place an edge 98 of the top portion 48 into the slot or space formed by and between the frame member 58 and the first projection 64. As the top portion 48 is slid under and past the lugs 78 and 80 the solenoid 46 is rotated slightly so that the edge 100 of portion 48 slides along the slanted portions 82 and 84 and the portions 48 and 50 then fit into the slot formed by the member 58 and projection 64 and the slot formed by the projection 66 and the projection 68, respectively. The solenoid 46 is secured in place when the edge 100 of the top portion 48 is engaged with the straight edge portions 86 and 88 of the lugs 78 and 80, as illustrated in FIG. 2.

It is thus seen that herein shown and described is a solenoid mounting bracket for use in a printer. The bracket has a plurality of projections that provide slots engageable by the solenoid frame portions and a plurality of lugs that maintain the solenoid in place. The structure and arrangement of the present invention enable the accomplishment of the objects and advantages mentioned above, and while a preferred embodiment has been disclosed herein, variations thereof may occur to those skilled in the art. It is contemplated that all such variations and modifications not departing from the spirit and scope of the invention hereof are to be construed in accordance with the following claims.

What is claimed is:

1. An arrangement for mounting a solenoid having a first frame portion and a second frame portion, said arrangement comprising a frame member of planar construction, a wall member formed integral with said frame member and extending substantially perpendicular therefrom, means formed integral with said frame member and with said wall member for supporting said wall member in a secure position relative to said frame member, a first projection formed integral with said wall member and spaced at a first distance from said frame member, a second projection formed integral with said wall member and spaced at a second distance from said frame member, a third projection formed integral with second projection substantially equal to said first distance, and lug means formed integral with said frame member and spaced at a third distance from said wall member, the first frame portion fitting into the space between the frame member and the first projection and the second frame portion fitting into the space between the second projection and the third projection, said lug means bearing against said first frame portion for maintaining said solenoid in a secure mounting.

2. The arrangement of the claim 1 wherein the first projection and the second projection extend substantially the same distance from the wall member and the third projection extends farther from the wall member than the first projection and the second projection.

3. The arrangement of claim 1 wherein said lug means comprise a pair of lugs formed integral with said wall member and spaced from each other.

4. The arrangement of claim 3 wherein each of said lugs includes a slanted portion engageable with said first frame portion of said solenoid for enabling the first frame portion of said solenoid to move into mounting position between said frame member and said first projection and a straight portion for bearing against one edge of said first frame portion when said solenoid is in mounting position.

5. The arrangement of claim 1 including wall means formed integral with said frame member and spaced from said wall member and extending substantially perpendicular therefrom and engageable by said solenoid in mounting thereof.

6. The arrangement of claim 5 wherein said wall means comprise a pair of walls formed integral with said frame member and spaced from each other at a distance corresponding to the length of said solenoid.

7. The arrangement of claim 1 including a pair of walls formed integral with said frame member and each having a slanted portion at one end thereof for receiving said solenoid for mounting thereof and said lug means comprises a pair of lugs each having a slanted portion enabling rotation of said solenoid into engagement with said projections for mounting of said solenoid.

8. A method for making a mounting for a solenoid having a first frame portion and a second frame portion comprising the steps of:

providing a frame member, forming a wall member integral with said frame member and extending substantially perpendicular therefrom, forming a first projection integral with said wall member and projecting therefrom and spaced at a first distance from said frame member, forming a second projection integral with said wall member and projecting therefrom and spaced at a second distance that is greater than said first distance from said frame member, forming a third projection integral with said wall member and projecting therefrom and spaced from said second projection at a distance substantially equal to said first distance, and forming lug means integral with said frame member and spaced from said wall member, the first frame portion being received into the space between the frame member and the first projection and the second frame member being received into the space between the second projection and the third projection, said lug means having a slanted surface for accommodating rotation of said solenoid and enabling placing of said first and said second frame portions into mounting position.

9. The method of claim 8 including the step of forming a pair of opposed walls integral with said frame member and extending substantially perpendicular from said wall member for guiding said solenoid into position for mounting thereof.

10. The method of claim 8 wherein said lug means comprise a pair of lugs each having a slanted surface for accommodating rotation of said solenoid and each having a straight surface engageable by one edge of said first frame portion for mounting said solenoid.

* * * * *

UNITED STATES PATENT AND TRADEMARK OFFICE
CERTIFICATE OF CORRECTION

PATENT NO. : 4,865,290
DATED : September 12, 1989
INVENTOR(S) : David E. Weeks

It is certified that error appears in the above-identified patent and that said Letters Patent is hereby corrected as shown below:

Column 7, line 4, after the word "with" insert --said wall member and spaced at a distance from said--

Signed and Sealed this

Sixteenth Day of October, 1990

Attest:

HARRY F. MANBECK, JR.

*Attesting Officer*  Commissioner of Patents and Trademarks

UNITED STATES PATENT AND TRADEMARK OFFICE
CERTIFICATE OF CORRECTION

PATENT NO. : 4,865,290

DATED : September 12, 1989

INVENTOR(S) : David E. Weeks

It is certified that error appears in the above-identified patent and that said Letters Patent is hereby corrected as shown below:

Title Page, add --[73] Assignee: NCR Corporation, Dayton, Ohio--

Title Page, add --Attorney, Agent, or Firm--Wilbert Hawk, Jr.; Albert L. Sessler, Jr.; George J. Muckenthaler--

Signed and Sealed this

Seventh Day of April, 1992

*Attest:*

HARRY F. MANBECK, JR.

*Attesting Officer*     *Commissioner of Patents and Trademarks*